(12) United States Patent
Frazier et al.

(10) Patent No.: US 8,793,474 B2
(45) Date of Patent: Jul. 29, 2014

(54) OBTAINING AND RELEASING HARDWARE THREADS WITHOUT HYPERVISOR INVOLVEMENT

(75) Inventors: Giles Roger Frazier, Austin, TX (US); Ronald P. Hall, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 12/886,091

(22) Filed: Sep. 20, 2010

(65) Prior Publication Data

US 2012/0072705 A1 Mar. 22, 2012

(51) Int. Cl.
*G06F 9/48* (2006.01)
*G06F 9/46* (2006.01)

(52) U.S. Cl.
CPC ... *G06F 9/48* (2013.01); *G06F 9/46* (2013.01)
USPC .......................................... 712/233; 712/228

(58) Field of Classification Search
CPC ............... G06F 9/38; G06F 9/30; G06F 9/46; G06F 9/48; G06F 9/50
See application file for complete search history.

(56) References Cited

U.S. PATENT DOCUMENTS

| | | | |
|---|---|---|---|
| 5,247,676 A | 9/1993 | Ozur et al. | |
| 5,978,857 A | 11/1999 | Graham | 719/312 |
| 6,105,055 A | 8/2000 | Pizano et al. | 709/204 |
| 6,233,599 B1 | 5/2001 | Nation et al. | 709/102 |
| 6,463,527 B1 | 10/2002 | Vishkin | |
| 6,629,237 B2 * | 9/2003 | Wolrich et al. | 712/228 |
| 6,742,146 B2 * | 5/2004 | Gross et al. | 714/702 |
| 6,993,640 B2 * | 1/2006 | Doing et al. | 712/200 |
| 7,434,221 B2 | 10/2008 | Hooper et al. | 718/100 |
| 7,516,366 B2 | 4/2009 | Lev et al. | |
| 7,587,584 B2 | 9/2009 | Enright et al. | 712/228 |
| 7,610,473 B2 | 10/2009 | Kissell | 712/235 |
| 7,631,307 B2 | 12/2009 | Wang et al. | 718/100 |
| 7,676,655 B2 | 3/2010 | Jordan | 712/214 |
| 8,296,775 B2 * | 10/2012 | Thornton et al. | 718/108 |
| 2002/0013861 A1 | 1/2002 | Adiletta et al. | |
| 2002/0144083 A1* | 10/2002 | Wang et al. | 712/23 |
| 2002/0166113 A1* | 11/2002 | Stoodley | 717/140 |
| 2002/0199179 A1* | 12/2002 | Lavery et al. | 717/158 |
| 2004/0117796 A1 | 6/2004 | Dichter | |

(Continued)

FOREIGN PATENT DOCUMENTS

CN 101477458 A 7/2009
WO WO 2011/141337 11/2011 ................ G06F 9/30

OTHER PUBLICATIONS

Jung et al, "Helper Thread Prefetching for Loosely-Coupled Multiprocessor Systems," 10 pp.; Seoul National University, Korea.

(Continued)

*Primary Examiner* — Eric Coleman
(74) *Attorney, Agent, or Firm* — VanLeeuwen & VanLeeuwen; Diana P. Gerhardt

(57) ABSTRACT

A first hardware thread executes a software program instruction, which instructs the first hardware thread to initiate a second hardware thread. As such, the first hardware thread identifies one or more register values accessible by the first hardware thread. Next, the first hardware thread copies the identified register values to one or more registers accessible by the second hardware thread. In turn, the second hardware thread accesses the copied register values included in the accessible registers and executes software code accordingly.

11 Claims, 17 Drawing Sheets

(56) References Cited

U.S. PATENT DOCUMENTS

| | | | |
|---|---|---|---|
| 2005/0071438 A1 | 3/2005 | Liao et al. ............... 709/214 |
| 2005/0081207 A1 | 4/2005 | Hoflehner et al. | |
| 2005/0125802 A1* | 6/2005 | Wang et al. ............... 718/108 |
| 2006/0080661 A1 | 4/2006 | Brokenshire et al. ........ 718/100 |
| 2006/0155963 A1 | 7/2006 | Bohrer et al. ............... 712/214 |
| 2006/0294347 A1 | 12/2006 | Zou et al. ............... 712/244 |
| 2007/0055852 A1* | 3/2007 | Hanes et al. ............... 712/228 |
| 2007/0271565 A1 | 11/2007 | Tirumalai et al. | |
| 2007/0294694 A1 | 12/2007 | Jeter et al. ............... 718/102 |
| 2008/0046689 A1 | 2/2008 | Chen et al. | |
| 2008/0215861 A1* | 9/2008 | Aamodt et al. ............... 712/226 |
| 2008/0282064 A1 | 11/2008 | Day et al. ............... 712/35 |
| 2009/0106538 A1 | 4/2009 | Bishop et al. ............... 712/226 |
| 2009/0125907 A1 | 5/2009 | Wen et al. | |
| 2009/0199181 A1 | 8/2009 | Arimilli et al. ............... 718/100 |
| 2009/0320040 A1 | 12/2009 | Robison | |
| 2010/0005277 A1 | 1/2010 | Gibert et al. ............... 712/220 |
| 2010/0153959 A1 | 6/2010 | Song et al. | |
| 2010/0162247 A1 | 6/2010 | Welc et al. | |
| 2012/0036339 A1 | 2/2012 | Frazier et al. ............... 712/220 |

OTHER PUBLICATIONS

Kumar et al., "Lock-Free Asynchronous Rendezvous Design for MPI Point-to-Point Communication," 9pp.; Dept. of Computer Science and Engineering, The Ohio State University; 2008.

Lu et al., "Dynamic Helper Threaded Prefetching on the Sun UltraSPARC CMP Processor," 12 pp.; 38th Annual IEEE/ACM (MICRO'05).

U.S. Appl. No. 12/849,903, filed Aug. 2010, Frazier et al.

Wang et al., "Helper Threads via Virtual Multithreading on an Experimental Itanium 2 Processor-based Platform," 12 pp.; Intel Corp.; ASPLOS'04, Oct. 9-13, 2004, Boston, MA.

Xekalakis et al., "Combining Thread Level Speculation, Helper Threads, and Runahead Execution," 11 pp.; University of Edinburgh; ICS'09, Jun. 8-12, 2009, Yorktown Heights, NY.

Office Action for U.S. Appl. No. 12/849,903 (Frazier et al., "Asynchronous Assist Thread Initiation," filed Aug. 4, 2010), U.S. Patent and Trademark Office, mailed Jun. 17, 2013, 16 pages.

International Search Report and Written Opinion for PCT Application PCT/EP2011/065565, mailed Dec. 15, 2011, 11 pages.

Song et al., "Design and Implementation of a Compiler Framework for Helper Threading on Multi-Core Processors," Sep. 2005, IEEE, Proceedings of the 14th Intl. Conference on Parallel Architectures and Compilation Techniques, Saint Louis, MO, 11 pages.

Office Action for U.S. Appl. No. 12/886,149 (Arndt et al., "Scaleable Status Tracking of Multiple Assist Hardware Threads," filed Sep. 20, 2010), U.S. Patent and Trademark Office, mailed Sep. 5, 2013, 15 pages.

Office Action for U.S. Appl. No. 13/748,540 (Arndt et al., "Scaleable Status Tracking of Multiple Assist Hardware Threads," filed Jan. 23, 2013), U.S. Patent and Trademark Office, mailed Oct. 7, 2013, 18 pages.

Office Action for U.S. Appl. No. 13/452,854 (Frazier et al., "Obtaining and Releasing Hardware Threads Without Hypervisor Involvement," filed Apr. 21, 2012), U.S. Patent and Trademark Office, mailed Mar. 28, 2014, 32 pages.

* cited by examiner

115 →

| Software Status Store | |
|---|---|
| ATN Value | Starting Address |
| 1 | 0BFE6 |
| 2 | 045DFE |
| . | . |
| . | . |
| n | ... |

| Hardware Status Store | | |
|---|---|---|
| ATN Value | Hardware Thread Number | Status |
| 1 | 3 | Terminated |
| 2 | 6 | Executing |
| . | . | . |
| . | . | . |
| n | ... | ... |

OBTAINING AND RELEASING HARDWARE THREADS WITHOUT HYPERVISOR INVOLVEMENT

TECHNICAL FIELD

The present disclosure relates to obtaining and releasing assist hardware threads without hypervisor involvement. More particularly, the present disclosure relates to main hardware thread initiating assist hardware threads that, in turn, execute software code segments.

BACKGROUND

Today's computer systems often include multi-threaded processors that execute independent instruction streams. A software program executing on a hardware thread may request, from a supervisor program (e.g., hypervisor), control of another hardware thread. For example, the software program may send a request to the supervisor program for another hardware thread in order for the other hardware thread to execute a code segment (e.g., subroutine). The supervisor program checks hardware thread availability and, if available, assigns the other hardware thread to the software program. In turn, the software program utilizes the other hardware thread to execute the code segment. In many cases, the software program utilizes the other hardware thread for a limited time. As such, when the other hardware thread completes code execution, the supervisor program releases the other hardware thread's resources from the software program.

SUMMARY

A first hardware thread executes a software program instruction, which instructs the first hardware thread to initiate a second hardware thread. As such, the first hardware thread identifies one or more register values accessible by the first hardware thread. The first hardware thread subsequently copies the identified register values to one or more registers accessible by the second hardware thread. In turn, the second hardware thread accesses the copied register values included in the accessible registers and executes software code accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein:

FIG. 3A is an exemplary diagram showing a software status storage area that a software program utilizes to manage assist hardware thread status;

FIG. 3B is an exemplary diagram showing a hardware status storage area that an initiating hardware thread utilizes to manage assist hardware thread status;

DETAILED DESCRIPTION

Figure 1:
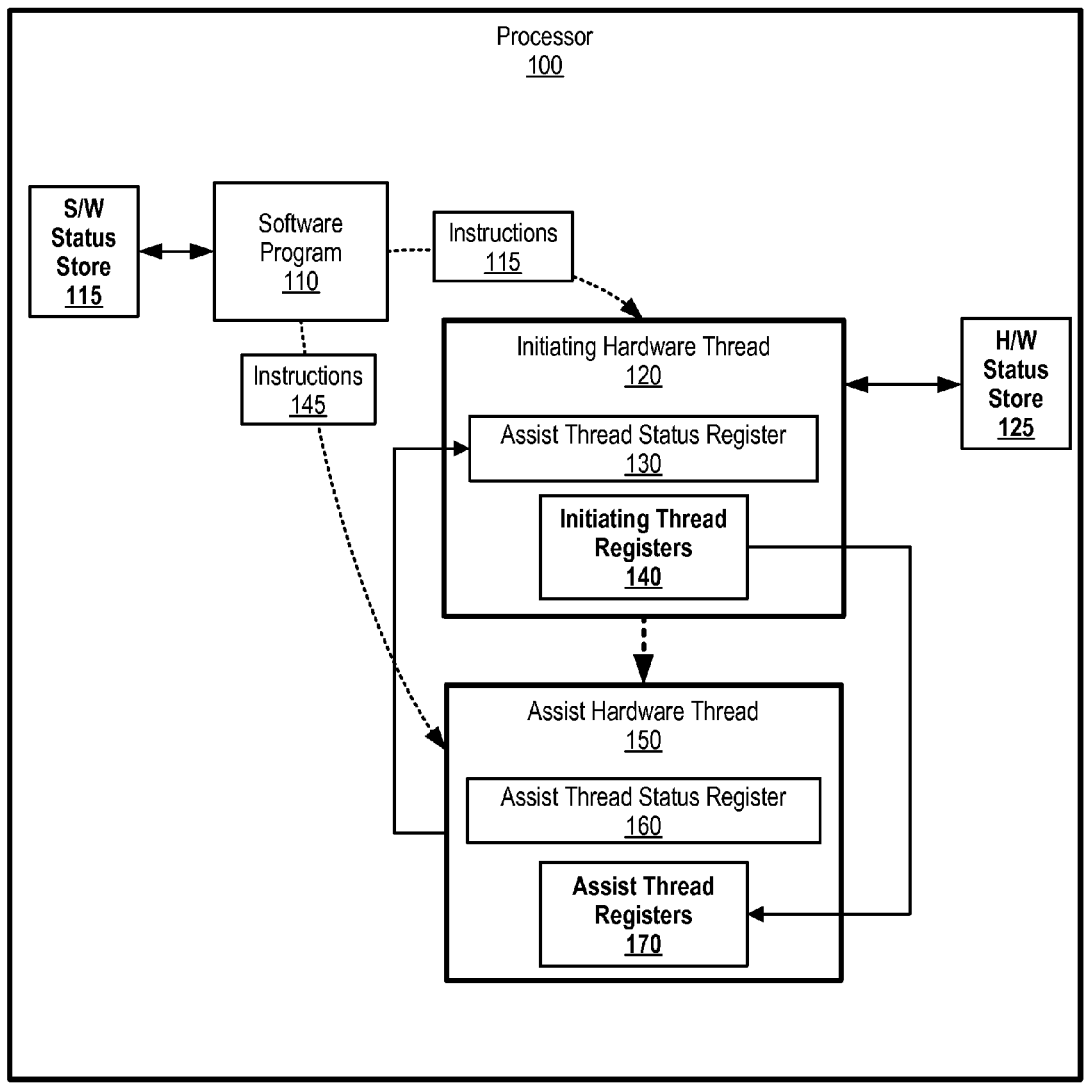
FIG. 1 is an exemplary diagram showing a processor's software program initiating an assist hardware thread on a multi-threaded processor.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language, VHDL (Very High Speed Integrated Circuit Hardware Description Language), or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is an exemplary diagram showing a processor's software program initiating an assist hardware thread on a multi-threaded processor without utilizing a hypervisor. Processor 100 assigns initiating hardware thread 120 to software program 110 when software program 110 commences executing. As software program 110 executes instructions 115 on initiating hardware thread 120, one of instructions 115 is a "branch and initiate instruction," which instructs initiating hardware thread 120 to check whether another hardware thread is available, such as for executing a subset of software program 110's instructions (instructions 145).

This disclosure describes two types of branch and initiate instructions, which are a branch and initiate light (BAIL) instruction and a branch and initiate heavy (BAIH) instruction. As discussed herein, the differences between the BAIL instruction and the BAIH instruction are that the BAIH instruction ensures that all initiating hardware thread store operations are visible to an assist hardware thread when the assist hardware thread begins execution. As such, when a software program requires memory synchronization, the software program may utilize a BAIH instruction instead of a BAIL instruction. In contrast, when a software program does not require memory synchronization, the software program may utilize a BAIL instruction instead of the BAIH instruction since the BAIL instruction does not guarantee memory synchronization and, in turn, executes faster. As those skilled in the art can appreciate, other types of branch and initiate instructions may be available to instruct an initiating hardware thread to initiate an assist hardware thread.

When initiating hardware thread 120 executes the branch and initiate instruction, initiating hardware thread 120 checks hardware status store 125 to determine whether another hardware thread is available. For example, processor 100 may include a bank of hardware threads, and hardware status store 125 includes information that indicates which of the hardware threads are available (see FIG. 3B and corresponding text for further details). When an assist hardware thread is available, initiating hardware thread 120 invokes assist hardware thread 150 and copies register values from initiating thread registers 140 to assist thread registers 170. In one embodiment, the register values that initiating hardware thread 120 copies from initiating thread registers 140 to assist thread register 170 depend upon the type of branch and initiate instruction as well as instruction parameter values (see FIGS. 6-7 and corresponding text for further details). In one embodiment, initiating hardware thread 120 and assist hardware thread 150 each have a dedicated execution unit for executing instructions.

Figure 2:
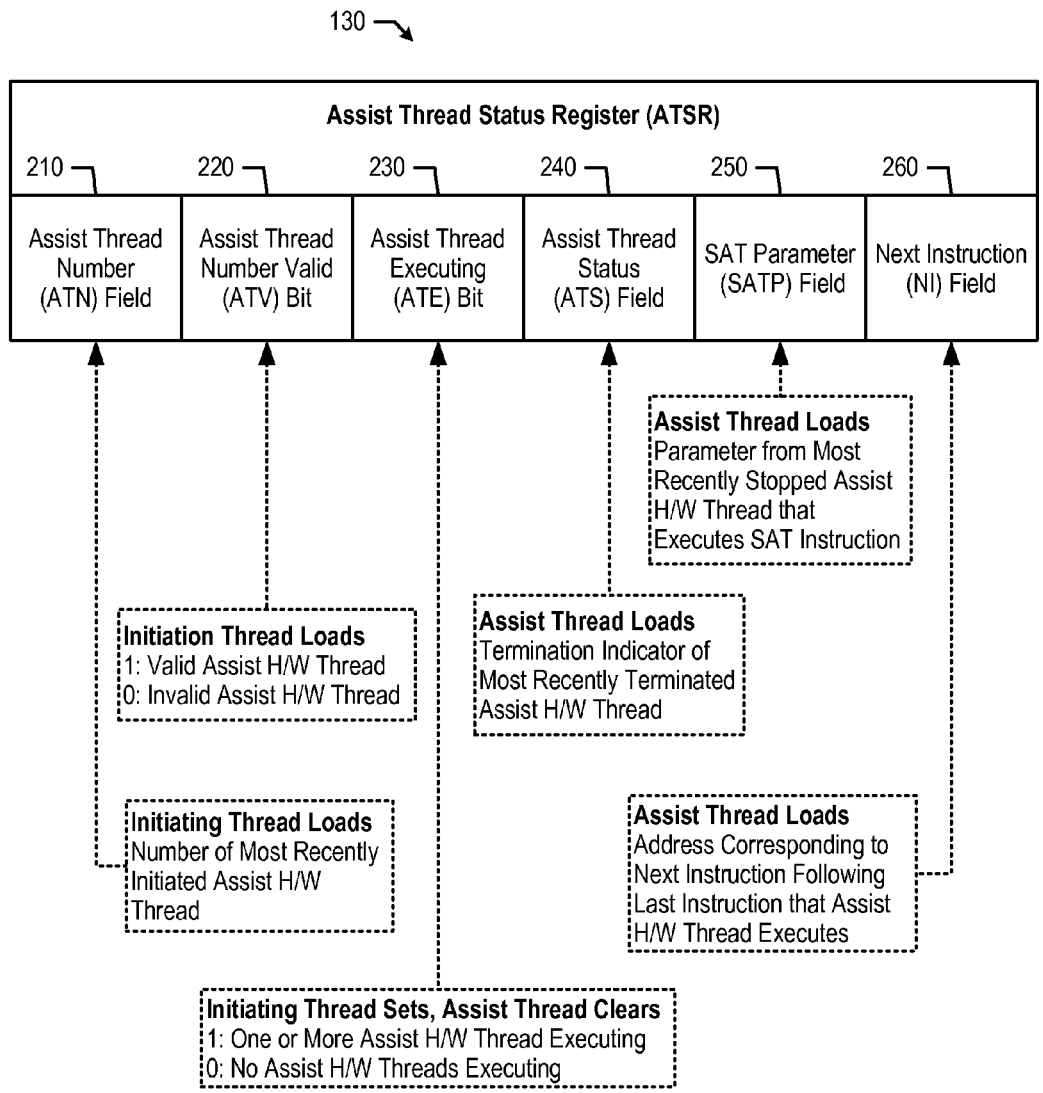
FIG. 2 is an exemplary diagram showing an assist thread status register (ATSR)

Initiating hardware thread 120 informs software program 110 that assist hardware thread 150 is available by setting an assist thread valid (ATV) bit that assist thread status register (ATSR) 130 includes (see FIG. 2, 4, and corresponding text for further details). Initiating hardware thread 120 also assigns an assist thread number (ATN) value to assist hardware thread 150, which initiating hardware thread 120 stores in hardware status store 125, and software program 110 stores in software status store 115 to track assist hardware thread 150's status.

Once assist hardware thread 150 initiates, software program 110 executes instructions 145 on assist hardware thread 150. Assist hardware thread 150 continues to execute instructions 145 until, for example, assist hardware thread 150 1) completes code execution; 2) executes a stop assist thread (SAT) instruction; 3) initiating hardware thread 120 executes a SAT instruction and terminates assist hardware thread 150; or 4) processor 100 terminates assist hardware thread 150 (see FIG. 5, 8, and corresponding text for further details). When assist hardware thread 150 stops executing, assist hardware thread 150 stores information in initiating hardware thread 120's assist thread status register 130, such as a termination indicator and address information (see FIG. 2, 8, and corresponding text for further details).

In one embodiment, software program 110 requests multiple assist hardware threads to execute different code segments. In this embodiment, the assist hardware thread, which stops executing last, writes the termination indicator and address information in assist thread status register 130 (see FIGS. 5, 14, and corresponding text for further details).

In another embodiment, assist hardware thread 150 may invoke a subsequent assist hardware thread. In this embodiment, assist hardware thread 150 becomes the "initiating hardware thread" of the subsequent assist hardware thread and uses assist thread status register 160 to store information pertaining to the subsequent assist hardware thread (see FIG. 15 and corresponding text for further details). In this embodiment, when initiating thread executes an instruction to terminate assist hardware thread 150, assist hardware thread 150 automatically terminates the subsequent assist hardware thread.

In yet another embodiment, software program 110 may wish to check assist hardware thread 150's particular status in order to determine whether assist hardware thread 150 is still executing. In this embodiment, software program 110 executes an "assist thread check" instruction on initiating thread 120, such as a branch conditional if assist thread executing (BCE) instruction or a condition register set if assist thread executing (CRSE) instruction. In this embodiment, software program 110 retrieves an assist thread number (ATN) from software status store 115 that corresponds to assist hardware thread 150 and stores the ATN in a general-purpose register. In turn, software program 110 includes the general-purpose register number in a BCE instruction, which initiating hardware thread 120 executes. Initiating hardware thread 120 retrieves the ATN from the general-purpose register and accesses hardware status store 125 to check assist hardware thread 150's status. In turn, initiating hardware thread 120 branches (or sets a condition bit) according to assist hardware thread 150's status (see FIGS. 10-13 and corresponding text for further details).

FIG. 2 is an exemplary diagram showing an assist thread status register (ATSR). An initiating hardware thread, such as initiating hardware thread 120, uses ATSR 130 to track overall assist hardware thread status. ATSR 130 includes fields 210-260 for storing such tracking information.

Assist thread number (ATN) field 210 includes a number corresponding to a most recently initiated assist hardware thread. For example, if initiating hardware thread 120 initiates assist hardware threads 1, 2, and 3 in order, ATN field includes the number "3." As such, ATSR 130 is platform scalable because ATSR 130 does not impose limits on the number of assist hardware threads that a particular initiating hardware thread may initiate (other than ATN field 210's bit amount limitations).

Assist thread number valid (ATV) bit 220 includes a bit that indicates ATN field 210's validity. A software program checks this bit to determine whether a requested assist hardware thread actually initiates (see FIG. 4 and corresponding text for further details).

ATSR 130 includes an assist thread executing indicator that, in one embodiment, is assist thread executing (ATE) bit 230, which indicates whether any assist hardware threads are currently executing. A software program may check ATE bit 230 with a single read operation and identify whether all of the assist hardware threads are finished executing (see FIGS. 4, 5, and corresponding text for further details).

Columns 240-260 include information that, in one embodiment, is only valid with ATE bit 230 indicates that no assist hardware threads are executing. Assist thread status (ATS) field 240 includes a termination indicator that indicates the basis of the last assist hardware thread's termination (e.g., assist thread executed a SAT instruction, initiating thread executed a SAT instruction, error encountered, processor preempted the resources, etc.).

SAT parameter (SATP) field 250 includes a parameter that a last executing assist hardware thread passes to the initiating hardware thread when the assist hardware thread executes a SAT instruction. For example, the SAT parameter may indicate whether the assist hardware thread successfully completed its task (code execution). Finally, next instruction (NI) field 260 includes an address of an instruction following the assist hardware thread's last executed instruction.

FIG. 3A is an exemplary diagram showing a software status storage area that a software program utilizes to manage assist hardware thread status. As can be seen, software status store 115 includes a list of assist thread number (ATN) values (column 300) and corresponding starting addresses (column 310) for assist hardware threads that are currently executing. In one embodiment, the starting address is an address that the BAIL/BATH instruction specifies for the assist hardware thread to start executing code (see FIGS. 6, 7, and corresponding text for further details). In yet another embodiment, software status store 115 may not include starting addresses, but rather store symbolic names for a corresponding task and, in this embodiment, have a different table that associates the symbolic names to code sections. Software status store 115 may be stored on volatile memory or a nonvolatile storage area, such as a computer hard drive.

FIG. 3B is an exemplary diagram showing a hardware status storage area that a hardware thread utilizes to manage assist hardware thread status. Similar to software status store 115 discussed above, hardware status store 125 includes a list of ATN values (column 320); corresponding hardware thread numbers (column 330) for assist hardware threads; and each assist hardware thread's status (column 340). In one embodiment, the corresponding thread numbers in column 330 may be the same as the assist thread numbers in column 320. As those skilled in the art can appreciate, hardware status store 125 may be a vector that stores information, such that each entry in the vector indicates a particular hardware thread's status.

Figure 4:
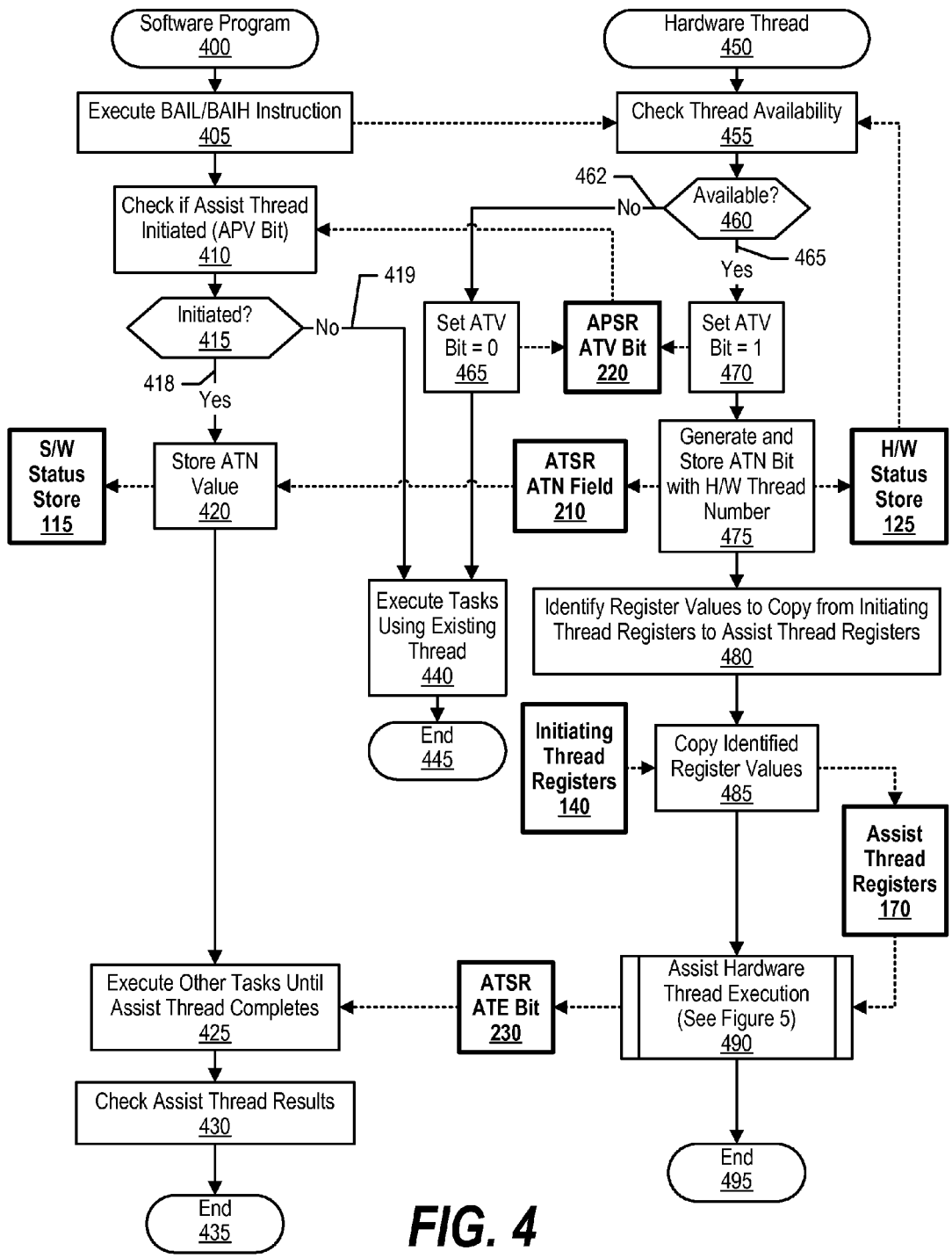
FIG. 4 is an exemplary flowchart showing steps taken in an initiating hardware thread invoking an assist hardware thread.

FIG. 4 is an exemplary flowchart showing steps taken in an initiating hardware thread invoking an assist hardware thread. Software program processing commences at 400, whereupon the software program executes a Branch and Initiate Light (BAIL) or a Branch and Initiate Heavy (BAIH) instruction at step 405. In one embodiment, the difference between the BAIL and BAIH instruction is the amount of memory synchronization that the initiating hardware thread performs (see FIG. 9 and corresponding text for further details).

Initiating hardware thread processing, which executes the software program, commences at 450, whereupon the initiating hardware thread accesses hardware status store 125 and checks whether a different hardware thread (assist hardware thread) is available. Hardware status store 125 includes information pertaining to a processor's hardware thread availability (see FIG. 3B and corresponding text for further details).

The initiating hardware thread determines whether another hardware thread is available for use as an assist hardware thread (decision 460). If an assist hardware thread is not available, decision 460 branches to "No" branch 462, whereupon the initiating hardware thread sets an assist thread number valid bit to "0" in Assist Thread Status Register (ATSR) ATV bit 220 (step 465). In turn, since an assist hardware thread is unavailable, the initiating hardware thread executes tasks targeted for the assist hardware thread at step 440, and processing ends at 445.

On the other hand, if an assist hardware thread is available, decision 460 branches to "Yes" branch 465, whereupon the initiating hardware thread sets the assist thread value (ATV) bit to "1" at step 470. Next, the initiating hardware thread generates an assist thread number (ATN) (e.g., incrementing a counter or a random number generator) and stores the assist thread number, along with an indication of the thread that is assigned as the assist hardware thread (e.g. another number or the same number as the ATN), in hardware status store 125. The initiating hardware thread also stores the ATN value in ATSR assist thread number field 210 (step 475).

At step 480, the initiating hardware thread identifies particular register values to copy from its registers to the assist hardware thread registers. The initiating hardware thread selects register values based upon parameters of the BAIL/BATH instruction. At step 485, the initiating hardware thread copies the identified register values from initiating thread registers 140 to assist thread registers 170.

Referring back to the software program, the software program checks ATSR ATV bit 220 at step 410 to determine whether the requested assist hardware thread initiates (decision 415). If the assist hardware thread does not initiate (e.g., ATV bit=0), the software program executes tasks with the initiating thread that were targeted for the assisted hardware thread as discussed above (step 440), and processing ends at 445.

On the other hand, if the requested assist hardware thread initiates, decision 415 branches to "Yes" branch 418, whereupon the software program may, in one embodiment, retrieve the assist thread number from ATSR ATN field 210, and store the retrieved ATN value in software status store 115. In another embodiment, the software program may not track the initiating assist hardware thread, such as when the assist hardware thread's task is to simply pre-fetch data into a cache in order to improve the initiating hardware thread's overall performance. Software status store 115 includes information for tracking the assist hardware threads that the software program invokes (see FIG. 3A and corresponding text for further details). In turn, the software program executes instructions using the initiated assist hardware thread (predefined process block 490, see FIG. 5 and corresponding text for further details).

When the assist hardware thread terminates (either by completing code execution or forced termination), the assist hardware thread clears ATSR Assist Thread Executing (ATE) bit 230. In one embodiment, the software program executes other tasks (step 425) while waiting for the assist hardware threads to complete. In another embodiment, the software program may request multiple assist hardware threads to execute various sections of the software program. In this embodiment, the assist hardware thread that is the last to complete clears ATSR ATE bit 230 (see FIG. 5 and corresponding text for further details).

When the assist hardware threads complete, the software program, in one embodiment, may check the assist hardware thread's results at step 430, such as using the results for subsequent computations. The software program and the initiating hardware thread end at 435 and 495, respectively. In one embodiment, the software program executing on the initiating hardware thread may proceed to perform other tasks, such as initiating additional assist hardware threads.

Figure 5:
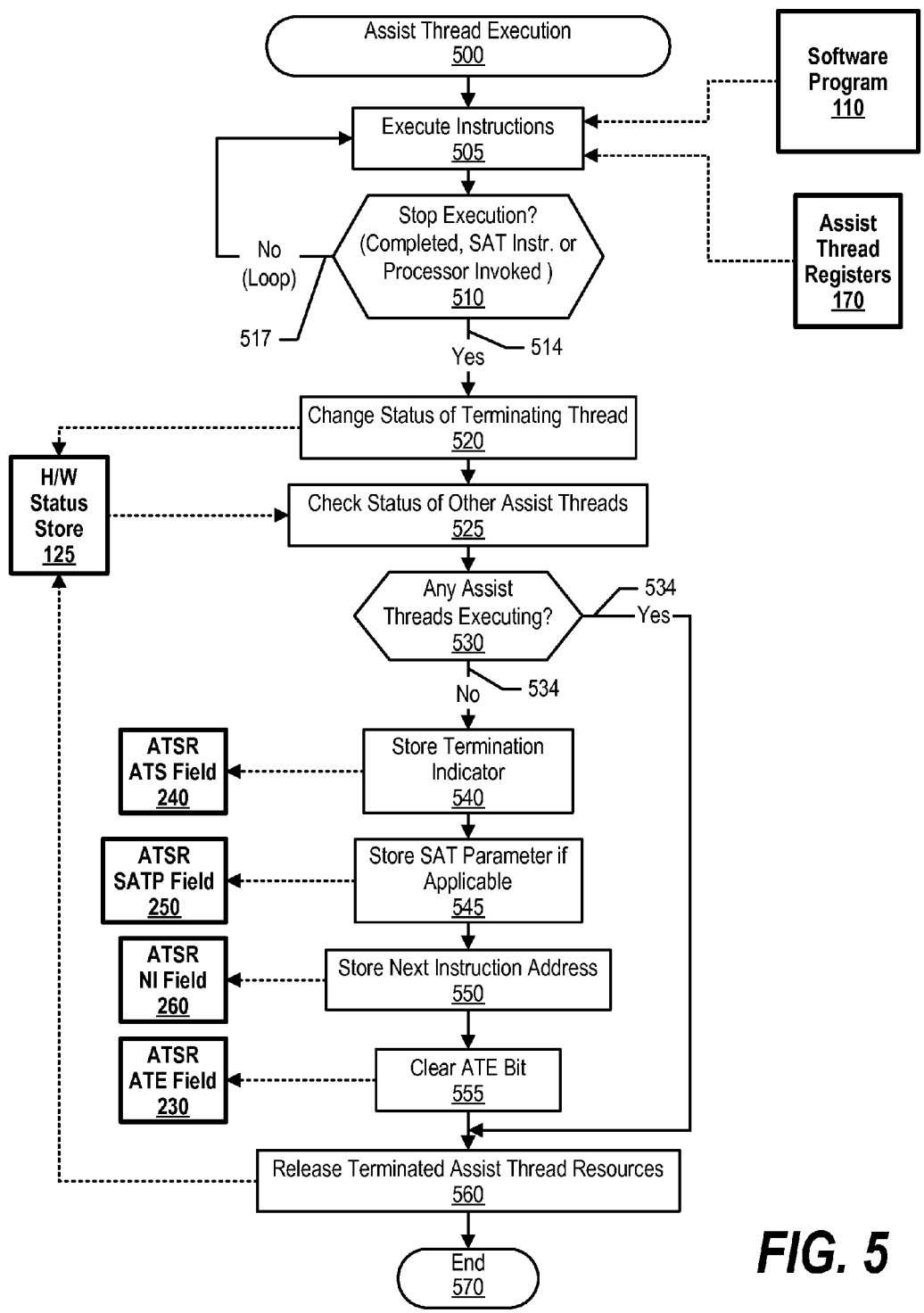
FIG. 5 is an exemplary flowchart showing steps taken in an assist hardware thread executing software code.

FIG. 5 is an exemplary flowchart showing steps taken in an assist hardware thread executing instructions. Assist hardware thread processing commences at 500, whereupon the assist hardware thread accesses register values that are stored in assist thread registers 170, and executes software program 110's instructions at step 505.

During instruction execution, the assist hardware thread determines whether to terminate executing in response to completing instruction execution or receiving an indication to terminate execution (decision 510). In one embodiment, the assist hardware thread may complete instruction execution or execute a Stop Assist Thread (SAT) instruction, which instructs the assist hardware thread to terminate instruction execution (see FIG. 8 and corresponding text for further details). In another embodiment, an initiating hardware thread may execute a SAT instruction and, in turn, terminate the assist hardware thread. In yet another embodiment, a processor that controls the initiating hardware thread and the assist hardware thread may terminate the assist hardware thread in order for the assist hardware thread to execute other higher-priority programs, or in order to reclaim the assist hardware thread's resources.

If the assist hardware thread should continue executing instructions, decision 510 branches to "No" branch 517, which loops back to continue executing instructions. This looping continues until the assist hardware thread terminates, at which point decision 510 branches to "Yes" branch 514.

At step 520, the assist hardware thread changes its status in hardware status store 125 from "executing" to "terminated." Next, the assist hardware thread checks the status of other assist hardware threads (step 525) in order to determine if other assist hardware threads are still executing (decision 530). If other assist hardware threads are still executing, decision 530 branches to "Yes" branch 532, whereupon the assist hardware thread releases its resources at step 560, and assist hardware thread processing ends at 570. In one embodiment, a processor (e.g., processor 100) may update the initiating hardware thread's ATSR bits after the assist hardware thread terminates.

On the other hand, if no other assist hardware threads are executing, decision 530 branches to "No" branch 534, whereupon the assist hardware thread stores a termination indicator in ATSR assist thread status (ATS) field 240 at step 540 (e.g., assist thread executed a SAT instruction, initiating thread executed a SAT instruction, error encountered, processor preempted the resources, etc.). The assist hardware thread stores a SAT parameter in ATSR SATP field 250 at step 545. For example, if the ATS field indicates that an assist hardware thread terminated because the assist hardware thread executed a SAT instruction, SATP field 250 may include a parameter that indicates whether the assist hardware thread successfully completed its task.

At step 550, the assist hardware thread stores an address corresponding to the next instruction following the last instruction that the assist thread executed in ATSR NI field 260 at step 550. Finally, the assist hardware thread clears the assist thread executing indicator in ATSR ATE field 230 at step 555, thus indicating to software program 110 that each assist hardware thread has stopped executing (see FIG. 4 and corresponding text for further details). The assist hardware thread releases its resources at 560 and ends at 570.

In one embodiment, a processor may ensure that all stores performed by the assist hardware thread are visible to the initiating hardware thread prior to step 555. In this embodiment, by ensuing that all of the assist hardware thread's stores are visible to the initiating hardware thread, the initiating hardware thread may read the assist hardware thread's results stored in memory (see FIG. 4 and corresponding text for further details).

Figure 6:
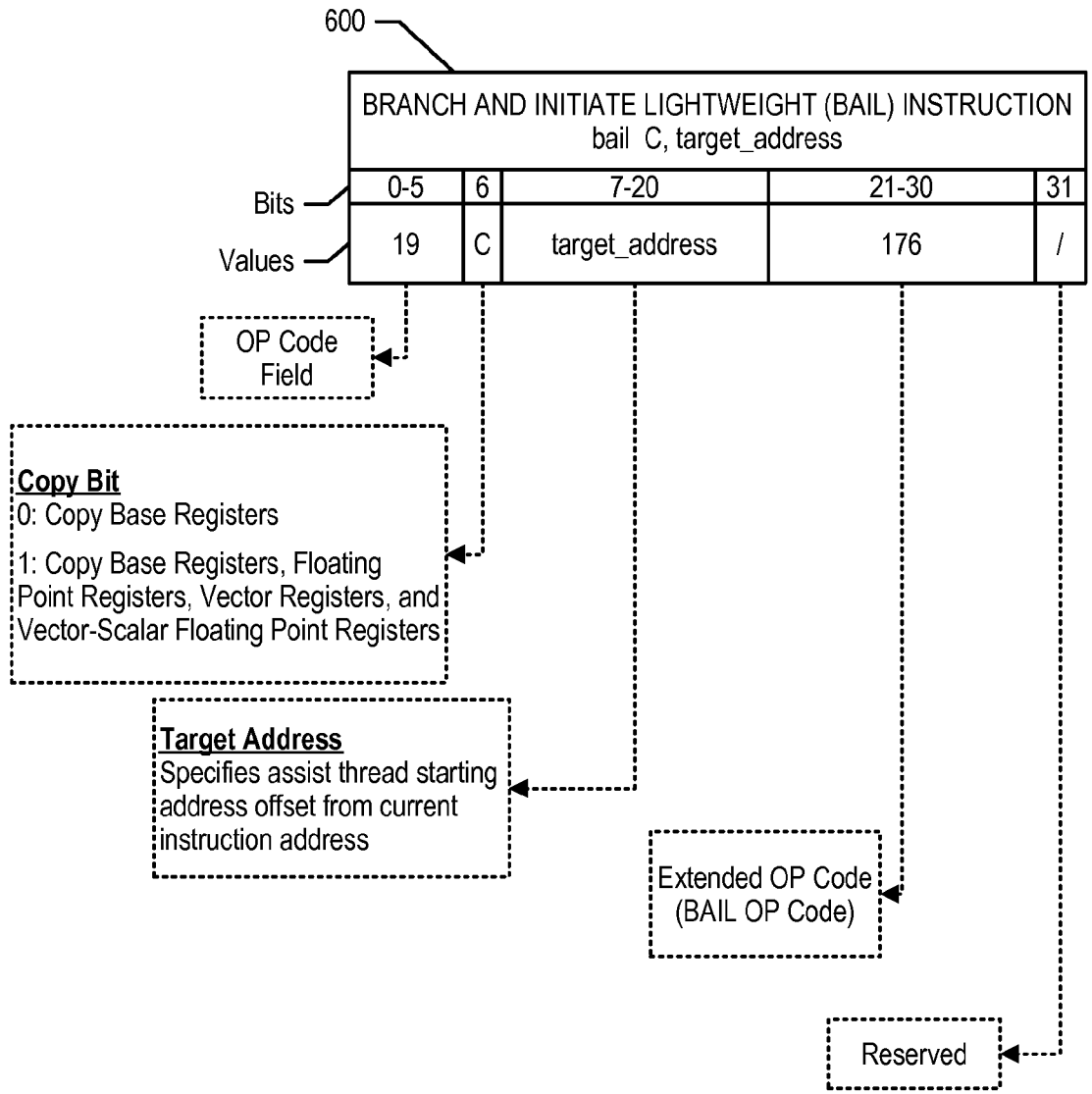
FIG. 6 is an exemplary diagram showing a branch and initiate lightweight (BAIL) instruction.

FIG. 6 is an exemplary diagram showing a branch and initiate lightweight (BAIL) instruction. BAIL instruction 600 enables software program 100 efficiently request an assist hardware thread from a multi-threaded processor without hypervisor involvement and without adversely affecting the hypervisor operation or other executing programs.

BAIL instruction 600 includes an op code field (bits 0-5) and an extended op code field (bits 21-30) that, when a hardware thread executes, instructs the hardware thread to check whether an assist hardware thread is available. If available, the initiating hardware thread copies particular register values, such as base register sets (general-purpose registers, privileged control registers, etc.), along with other register values based upon copy bit "6" (floating point, vector unit, etc.), from the initiating hardware thread's registers to the assist hardware thread's registers (see FIG. 9 and corresponding text for further details). Once copied, the assist hardware thread starts executing code corresponding to a target address located in BAIL instruction 600's bits 7-20. As those skilled in the art can appreciate, BAIL instruction 600 may include more or less bits and/or partitioned differently than what in FIG. 6 shows.

Figure 7:
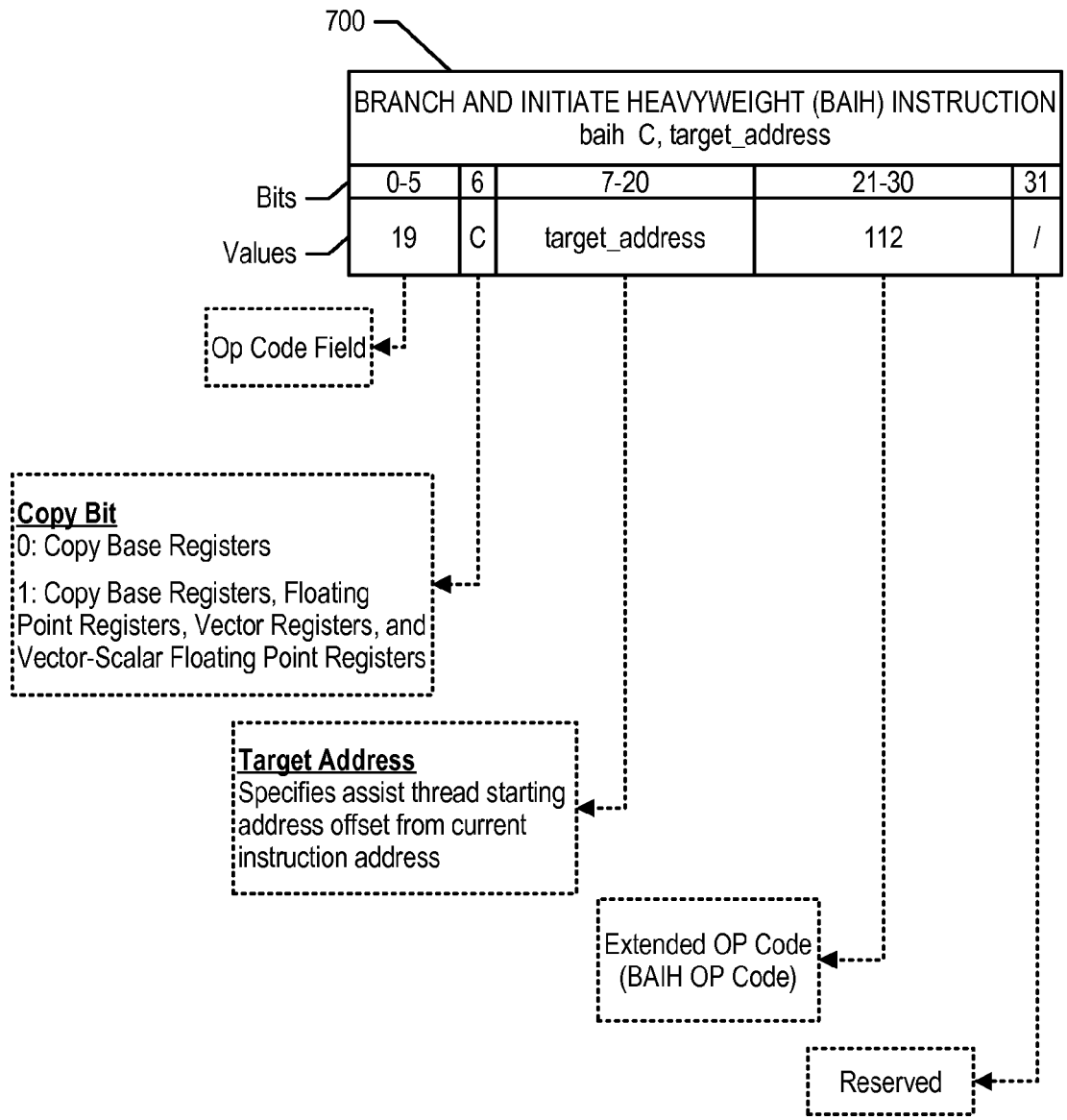
FIG. 7 is an exemplary diagram showing a branch and initiate heavyweight (BAIH) instruction.

FIG. 7 is an exemplary diagram showing a branch and initiate heavyweight (BAIH) instruction. BAIH instruction 700 is similar to BAIL instruction shown in FIG. 6. The BAIH instruction, however, may also perform a memory synchronization step compared to the BAIL instruction.

BAIH instruction includes an op code field (bits 0-5) and an extended op code field (bits 21-30) that, when a hardware thread executes, instructs the hardware thread to check whether an assist hardware thread is available. If available, the initiating hardware thread copies particular register values, such as base register sets (general-purpose registers, privileged control registers, etc.), along with other registers based upon copy bit "6" (floating point, vector unit, etc.) (see FIG. 9 and corresponding text for further details).

Once the initiating hardware thread copies the register values to the assist hardware thread registers, the assist hardware thread starts executing code corresponding to a target address located in BAIH instruction 600's bits 7-20. As those skilled in the art can appreciate, BAIH instruction may include more or less bits and/or partitioned differently than what FIG. 7 shows.

Figure 8:
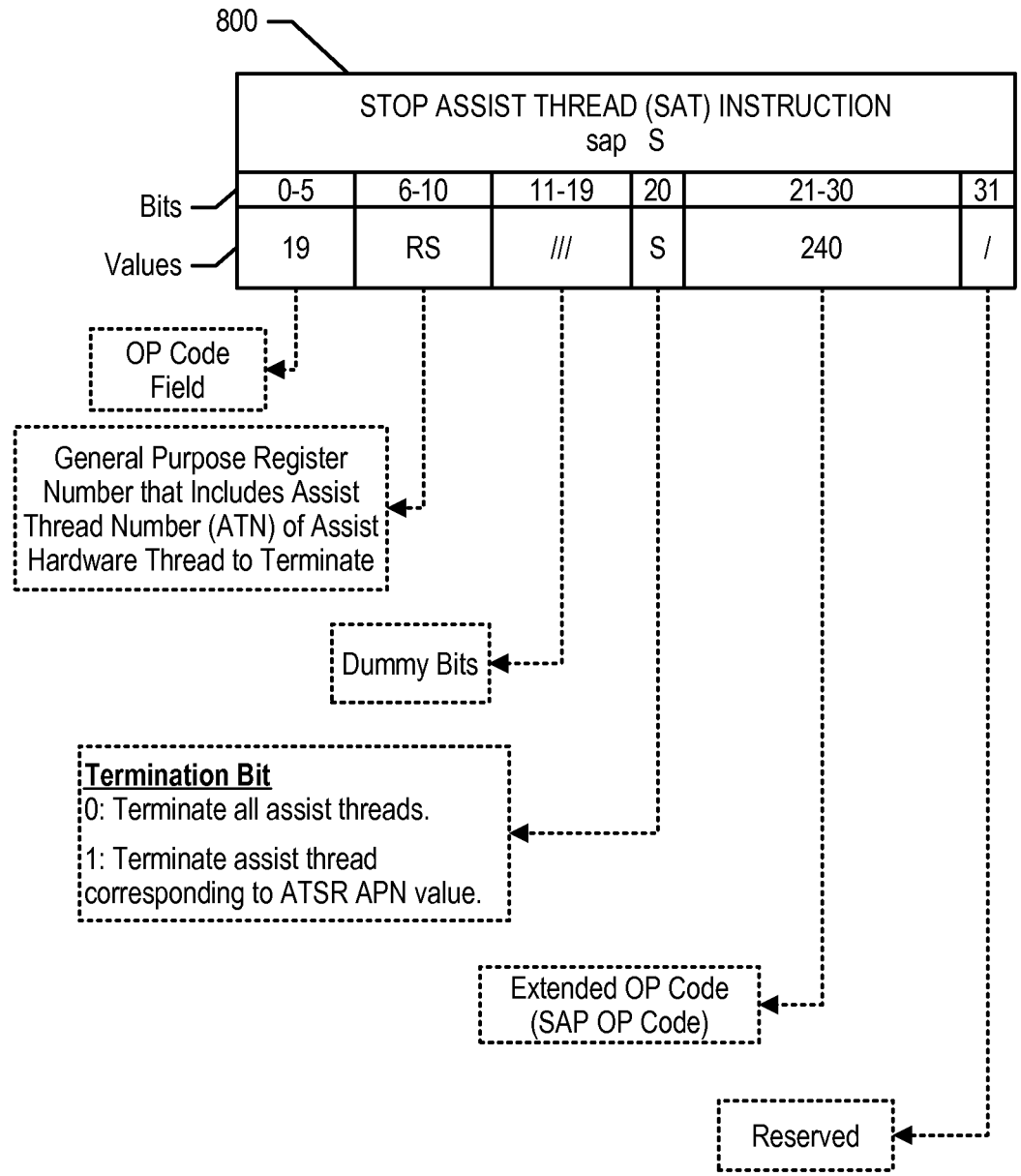
FIG. 8 is an exemplary diagram showing a stop assist thread (SAT) instruction.

FIG. 8 is an exemplary diagram showing a stop assist thread (SAT) instruction. As an assist hardware thread executes, the assist hardware thread (or an initiating hardware thread) may execute a SAT instruction, which instructs the assist hardware thread to stop executing. When an initiating thread executes SAT instruction 800, the initiating thread instructs the assist hardware thread to stop executing (terminate). When an assist hardware thread executes SAT instruction 800, the assist thread stops its own execution.

SAT instruction 800 includes an op code field (bits 0-5) and an extended op code field (bits 21-30) that, when an initiating hardware thread executes, informs the initiating hardware thread to instruct one or more assist hardware threads to stop executing. SAT instruction 800 also includes a termination bit 20 that, when executed by an initiating hardware thread, instructs the initiating hardware thread to either terminate all active assist hardware threads or terminate a particular assist hardware thread. When bit 20 signifies terminating a particular assist hardware thread, bits 6-10 include a source register (RS) location (e.g., general-purpose register location) that includes an assist thread number (ATN) corresponding to the assist hardware thread for which to terminate.

In another embodiment, when an assist hardware thread executes SAT instruction 800, the assist hardware thread may use bit 20 to pass back a SAT parameter to its initiating hardware thread. For example, the assist hardware thread may store a "1" in bit 20 when it completes the code execution and may store a "0" in bit 20 when it fails to complete the code execution. In this embodiment, the assist hardware thread ignores bits 6-10 when it executes SAT instruction 800.

In yet another embodiment, SAT instruction 800 may be devoid of an RS field (bits 6-10). In this embodiment, the initiating hardware thread terminates all active assist hardware threads it initiated, regardless of bit 20's value (e.g., ignores bit 20).

Figure 9:
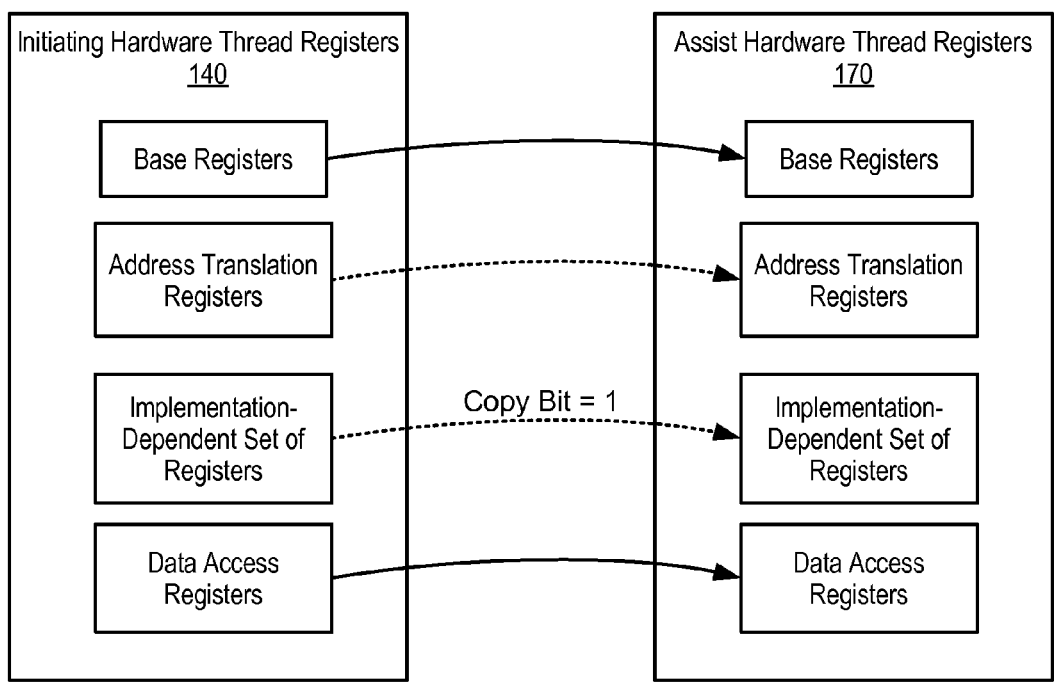
FIG. 9 is an exemplary diagram showing register values that an initiating hardware thread copies to assist thread registers during a branch and initiate instruction.

FIG. 9 is an exemplary diagram showing register values that an initiating hardware thread copies from initiating thread registers to assist thread registers during BAIL and BAIH instructions. FIG. 9 shows that, during these instructions, the initiating hardware thread copies base register values (e.g. General-purpose Registers, Condition registers, and other registers essential to most computing tasks).

In one embodiment, the initiating hardware thread copies address translation register values from initiating hardware thread registers 140 to assist hardware thread registers 170 (e.g. register values for converting effective or virtual addresses to real addresses). In another embodiment, the initiating hardware thread and the assist hardware thread may share the same address translation registers, or the assist hardware thread's translation registers may be preset. In this embodiment, a software program may configure the initiating hardware thread such that the initiating hardware thread does not copy the address translation register values.

Based upon the BAIL/BAIH instruction's copy bit, the initiating hardware thread may also copy an implementation-dependent set of register values from initiating hardware thread registers 140 to assist hardware thread registers 170 (see FIG. 6 and corresponding text for further details). In one embodiment, the implementation-dependent set of registers include vector registers, floating point registers, and other register sets associated with specialized computing tasks that an assist hardware thread occasionally requires.

In one embodiment, in order to remove any residual values from previous computations, the initiating hardware thread may clear the registers in assist hardware thread registers 170's that do not include register values copied from initiating hardware thread registers 140.

Although the BAIL and BAIH instructions may perform the same set of register copies, the instructions differ, in one embodiment, in the initiating hardware thread's memory synchronization. For example, processors that perform memory "stores" out of order, a memory store performed by one instruction is not guaranteed to complete before a following instruction executes. Thus, in this example, if an instruction following a store operation initiates an assist hardware thread, no guarantee exists that the store operation completes before the assist thread initiates. If the store operation does not complete, the store operation value may not be visible to the assist thread for an indeterminate time. As such, a problem arises when the assist hardware thread requires access to the stored information in order to carry out its task.

The BAIH instruction alleviates this issue because the BAIH instruction ensures that stores performed by the initiating thread are complete enough for assist hardware thread visibility before the assist hardware thread initiates, thus allowing the assist hardware thread to read the memory locations and perform tasks accordingly. When a software program does not require memory synchronization, the software program may utilize a BAIL instruction because of its execution speed since it does not guarantee memory synchronization.

In one embodiment, BAIL and BAIH instructions have many variations. For example, for processors that do not perform out of order storage operations, the processor may not utilize a BAIH instruction, although some embodiments might utilize a form of a BAIL instruction that copies a larger set of registers compared with the BAIH instruction. In another example, implementations that do not guarantee in-order stores may configure a BAIH instruction so that the initiating hardware thread copies more registers than a BAIL instructions according to the needs of a particular application.

Figure 10:
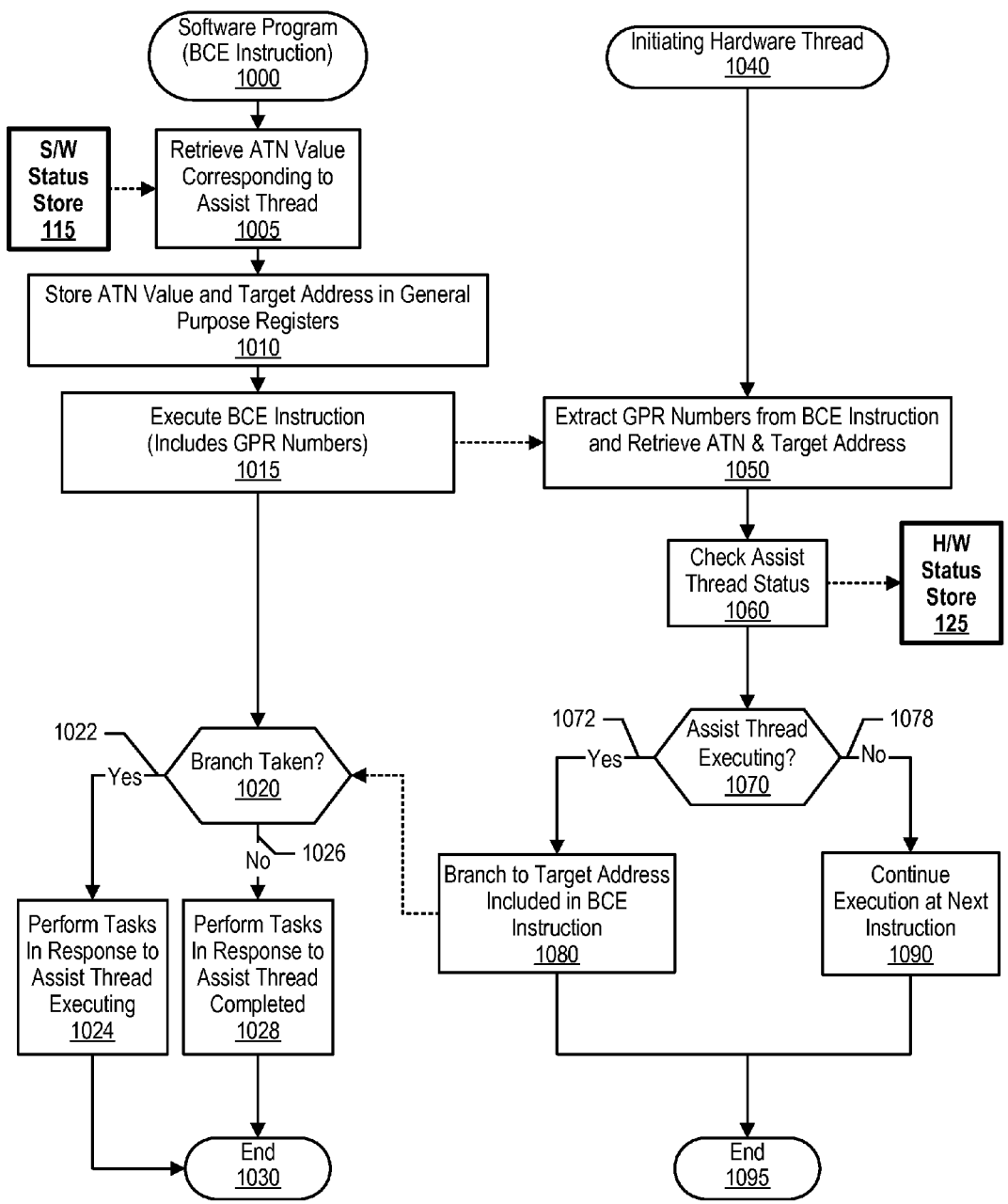
FIG. 10 is an exemplary flowchart showing steps taken in executing a branch conditional if assist thread executing (BCE) instruction.

FIG. 10 is an exemplary flowchart showing steps taken in executing a branch conditional if assist thread executing (BCE) instruction. Situations may arise when a software program requires a particular assist hardware thread's status. In these situations, the software program may execute a conditional branch instruction on the initiating hardware thread, which branches based upon whether the particular assist hardware thread is still executing.

BCE software program execution commences at 1000, whereupon the software program retrieves an assist thread number (ATN) value from software status store 115 corresponding to a particular assist thread (step 1005). At step 1010, the software program stores the ATN value in a particular general-purpose register (e.g., register "4") and a target address in another general-purpose register (e.g., register "5"), which identifies a location in code for the initiating hardware thread to execute when the assist hardware thread is still executing (discussed below). Next, the software program executes the branch conditional if assist thread executing (BCE) instruction on the initiating hardware thread, which includes the general-purpose register locations of the ATN value and the target address (step 1015).

Initiating hardware thread execution commences at 1040, whereupon the initiating hardware thread extracts the general-purpose register numbers from the BCE instruction and retrieves the ATN, along with the target address, from the general-purpose registers (step 1050). Next, the initiating hardware thread checks the corresponding assist hardware thread's status in hardware status store 125 at step 1060.

The initiating hardware thread determines whether the assist hardware thread is still executing based upon the status at step 1060 (decision 1070). If the assist hardware thread is still executing, decision 1070 branches to "Yes" branch 1072, whereupon the initiating hardware thread branches to the target address that was retrieved in step 1050 (step 1080). On the other hand, if the assist hardware thread terminated, decision 1070 branches to "No" branch 1078 whereupon the initiating hardware thread continues executing at the next instruction (step 1090).

The software program determines whether the particular assist hardware thread is still executing based upon whether the initiating hardware thread branches (decision 1020). If the initiating hardware thread branches, decision 1020 branches to "Yes" branch 1022 whereupon the software program performs tasks according to the assist hardware thread still executing at step 1024, such as continuing to work on tasks unrelated to the task given to the assist thread. On the other hand, if the initiating hardware thread does not branch, decision 1020 branches to "No" branch 1026 whereupon the software program performs tasks according to the assist hardware thread terminating (step 1028). For example, the software program may check shared memory locations to determine whether the assist hardware thread successfully completed it's operations and perform additional tasks accordingly (e.g. starting another assist thread, performing other work, etc.). Software program and initiating hardware thread processing ends at 1030 and 1095, respectively.

Figure 11:
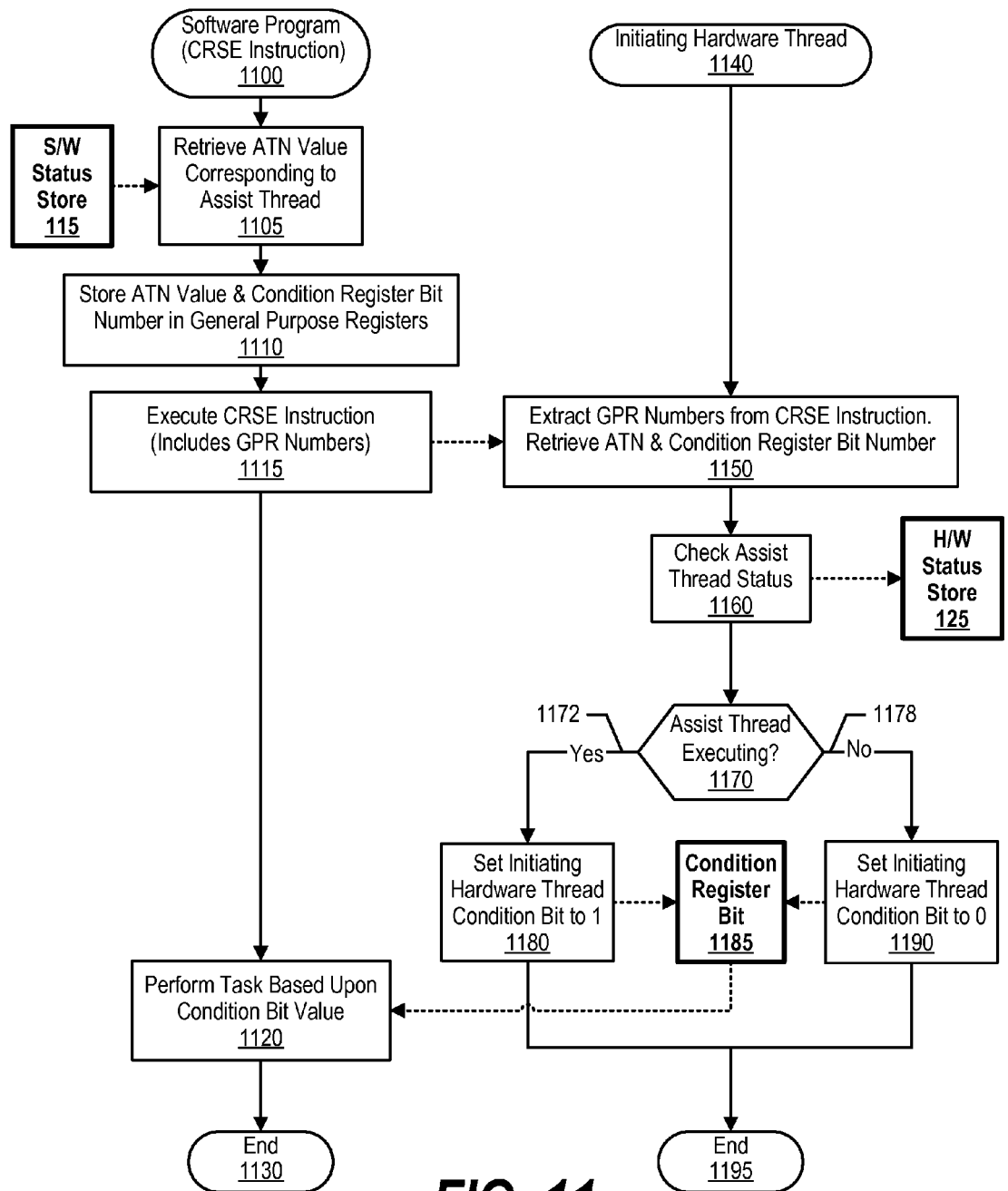
FIG. 11 is an exemplary flowchart showing steps taken in executing a condition register set if assist thread executing (CRSE) instruction.

FIG. 11 is an exemplary flowchart showing steps taken in executing a condition register set if assist thread executing (CRSE) instruction. The CRSE instruction is similar to the BCE instruction discussed in FIG. 10 with the exception that an initiating thread sets a condition bit based upon the status of a particular assist hardware thread instead of branching to a target address.

CRSE software program execution commences at 1100, whereupon the software program retrieves an assist thread number (ATN) value from software status store 115 corresponding to a particular assist thread (step 1105). At step 1110, the software program stores the ATN value, along with a condition register bit location, in particular general-purpose registers (GPRs). The condition register bit location corresponds to a condition register bit for which the initiating hardware register sets based upon the status of the assist hardware thread (discussed below). Next, the software program includes the GPR register locations in the CRSE instruction and executes the CRSE instruction using the initiating hardware thread (1115).

Initiating hardware thread execution commences at 1140, whereupon the initiating hardware thread extracts the general-purpose register numbers from the CRSE instruction, and retrieves the ATN, along with the condition register bit location, from the general-purpose registers corresponding to the extracted general-purpose register numbers (step 1150). Next, the initiating hardware thread checks the retrieved ATN's corresponding assist hardware thread's status in hardware status store 125 at step 1160.

The initiating hardware thread determines whether the assist hardware thread is still executing based upon the status at step 1160 (decision 1170). If the assist hardware thread is still executing, decision 1170 branches to "Yes" branch 1072, whereupon the initiating hardware thread sets condition register bit 1185 at step 1180, which corresponds to the retrieved condition register bit location discussed above. On the other hand, if the assist hardware thread terminated, decision 1170 branches to "No" branch 1078 whereupon the initiating hardware thread sets condition register bit 1185 to "0" (step 1090).

The software program determines whether the particular assist hardware thread is still executing by checking condition register bit 1185, and performs tasks accordingly at step 1120. Software program and initiating hardware thread processing ends at 1130 and 1195, respectively.

Figure 12:
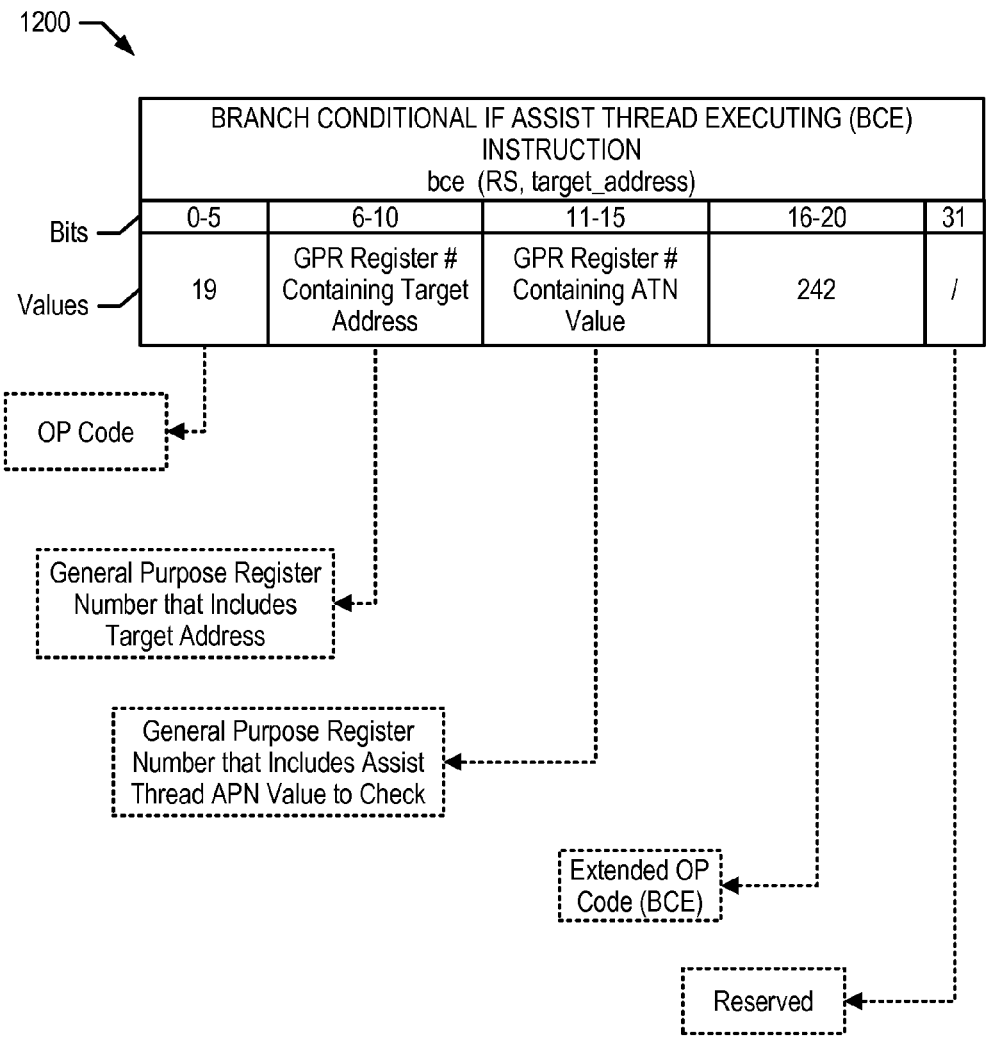
FIG. 12 is an exemplary diagram showing a branch conditional if assist thread executing (BCE) instruction.

FIG. 12 is an exemplary diagram showing a branch conditional if assist thread executing (BCE) instruction. BCE instruction 1200 enables a software program determine whether a particular assist hardware thread is still executing code by instructing an initiating hardware thread to branch to a target address when the initiating hardware thread determines that the assist hardware thread is executing.

BCE instruction 1200 includes an op code field (bits 0-5) and an extended op code field (bits 16-20) that, when a hardware thread executes, instructs the "initiating" hardware thread to check whether an assist hardware thread is executing. BCE instruction 1200 includes bits 11-15, which identify a general-purpose register that includes an assist thread number (ATN) for the assist hardware thread to check. If the assist hardware thread is still executing, the initiating hardware thread branches to a target address that is included in a general-purpose register identified by bits 6-10 (see FIG. 10 and corresponding text for further details). As those skilled in the art can appreciate, BCE instruction 1200 may include more or less bits and/or partitioned differently than what in FIG. 12 shows.

Figure 13:
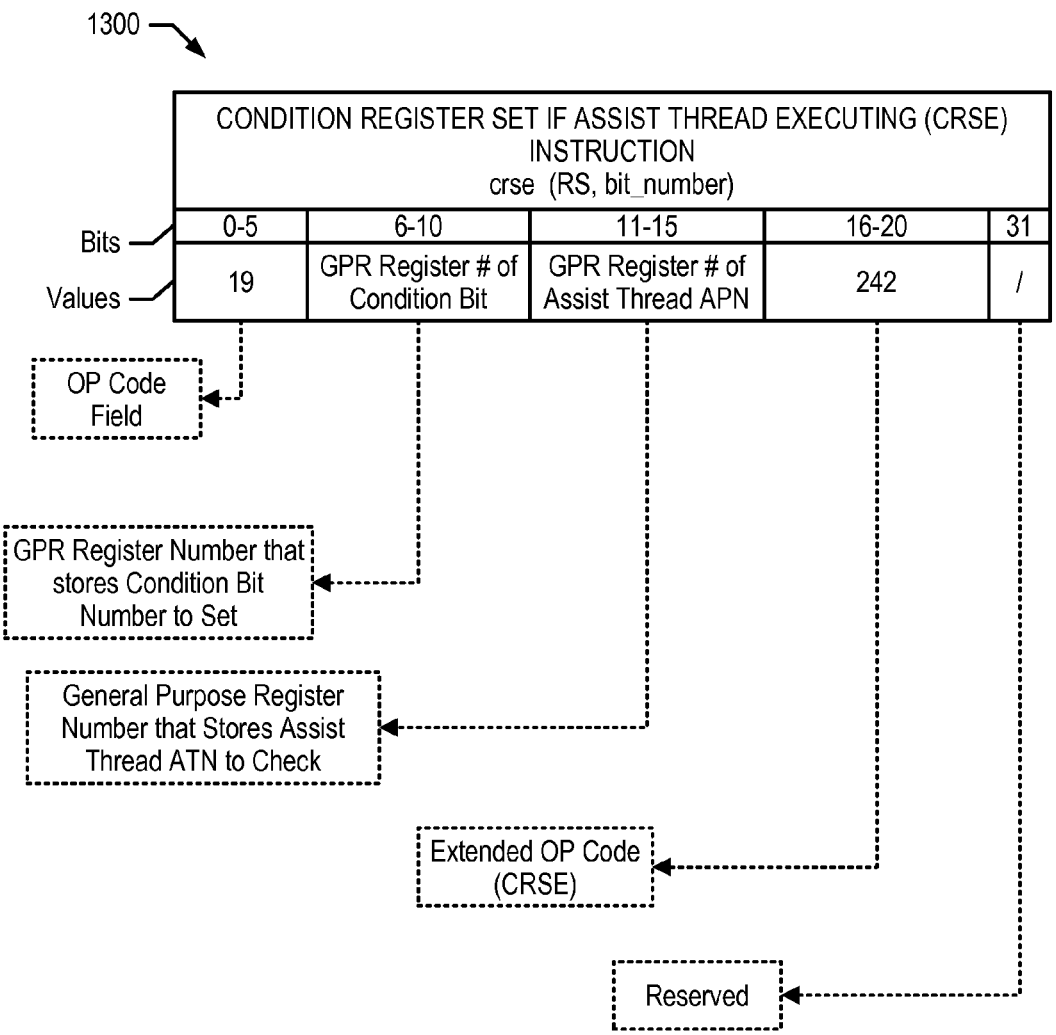
FIG. 13 is an exemplary diagram showing a condition register set if assist thread executing (CRSE) instruction.

FIG. 13 is an exemplary diagram showing a condition register set if assist thread executing (CRSE) instruction. CRSE instruction 1300 enables a software program to determine whether a particular assist hardware thread is still executing code by instructing an initiating hardware thread to set a condition register bit when the initiating hardware thread determines that the assist hardware thread is executing.

CRSE instruction 1300 includes an op code field (bits 0-5) and an extended op code field (bits 16-20) that, when a hardware thread executes, instructs the "initiating" hardware thread to check whether an assist hardware thread is executing. BCE instruction 1200 includes bits 11-15, which identify a general-purpose register that includes an assist thread number (ATN) for the assist hardware thread to check. Bits 6-10 specify a general-purpose register that includes a condition register bit location that the initiating hardware register sets when the assist hardware thread is executing (see FIG. 11 and corresponding text for further details). As those skilled in the art can appreciate, processors use condition register bits for various types of branch instructions, or for indicating status such as arithmetic operation overflow. As those skilled in the art can also appreciate, BCE instruction 1200 may include more or less bits and/or partitioned differently than what in FIG. 13 shows.

Figure 14:
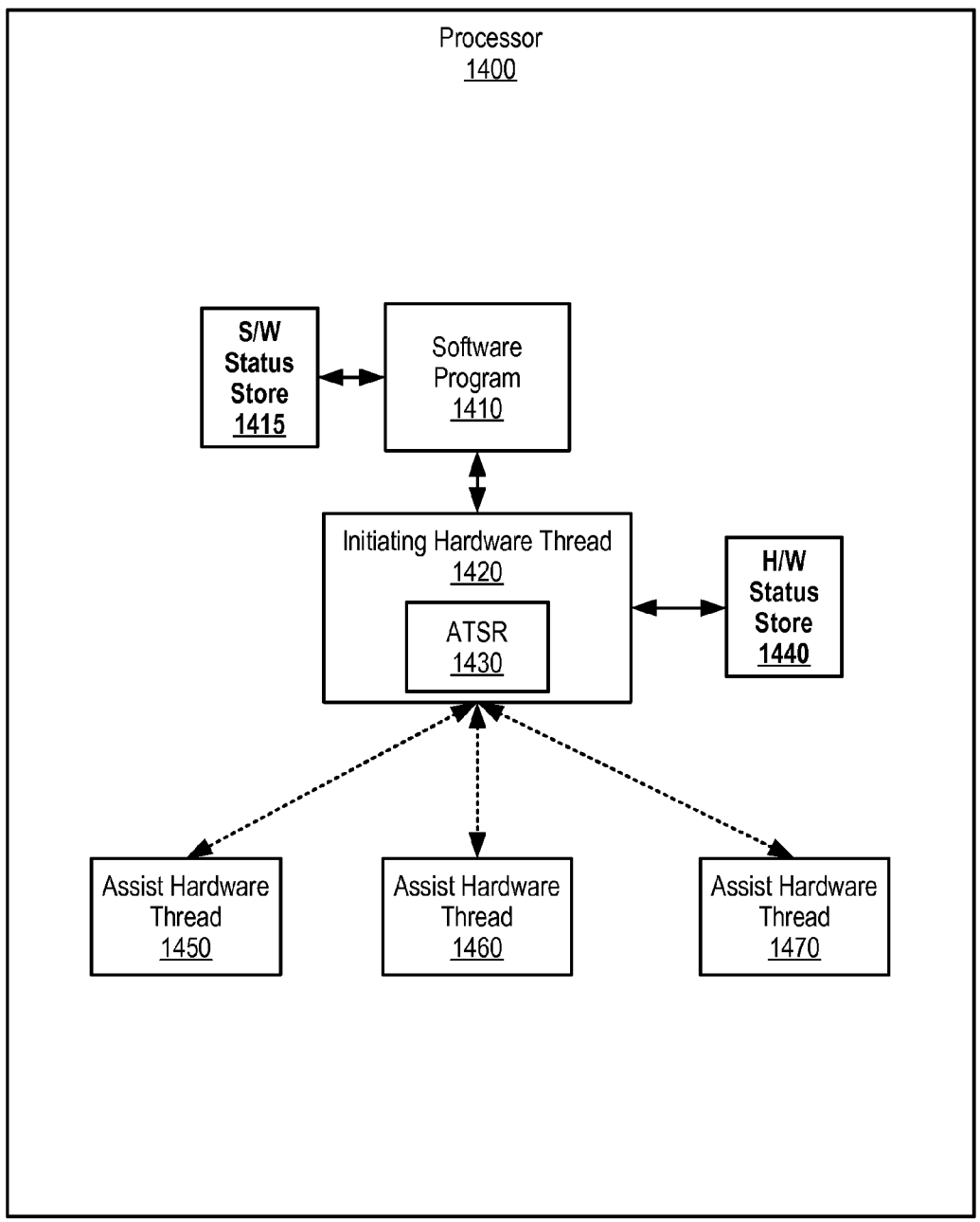
FIG. 14 is an exemplary diagram showing an initiating hardware thread invoking multiple assist hardware threads.

FIG. 14 is an exemplary diagram showing an initiating hardware thread invoking multiple assist hardware threads. Processor 100 assigns initiating hardware thread 1420 to software program 1410 when software program 1410 commences. Software program 1410 includes multiple branch and initiate instructions described herein (e.g., BAIL and/or BAIH instructions), such as for executing a particular task's different sections of code. In turn, initiating hardware thread 1420 checks hardware thread availability; initiates assist hardware threads 1450-1470; and assigns a specific assist thread number (ATN) to each assist hardware thread. Initiating hardware thread 1420 stores the ATN's in hardware status store 1440 and software program 1410 stores the ATN's in software status store 1415 for tracking purposes.

Initiating hardware thread 1420 includes ATSR 1430, which stores information pertaining to the most recently initiated assist hardware thread (e.g., assist hardware thread 1470's ATN). In turn, the last of assist hardware threads 1450-1470 that stops executing stores information in ATSR 1430 (see FIGS. 2, 5, and corresponding text for further details).

Figure 15:
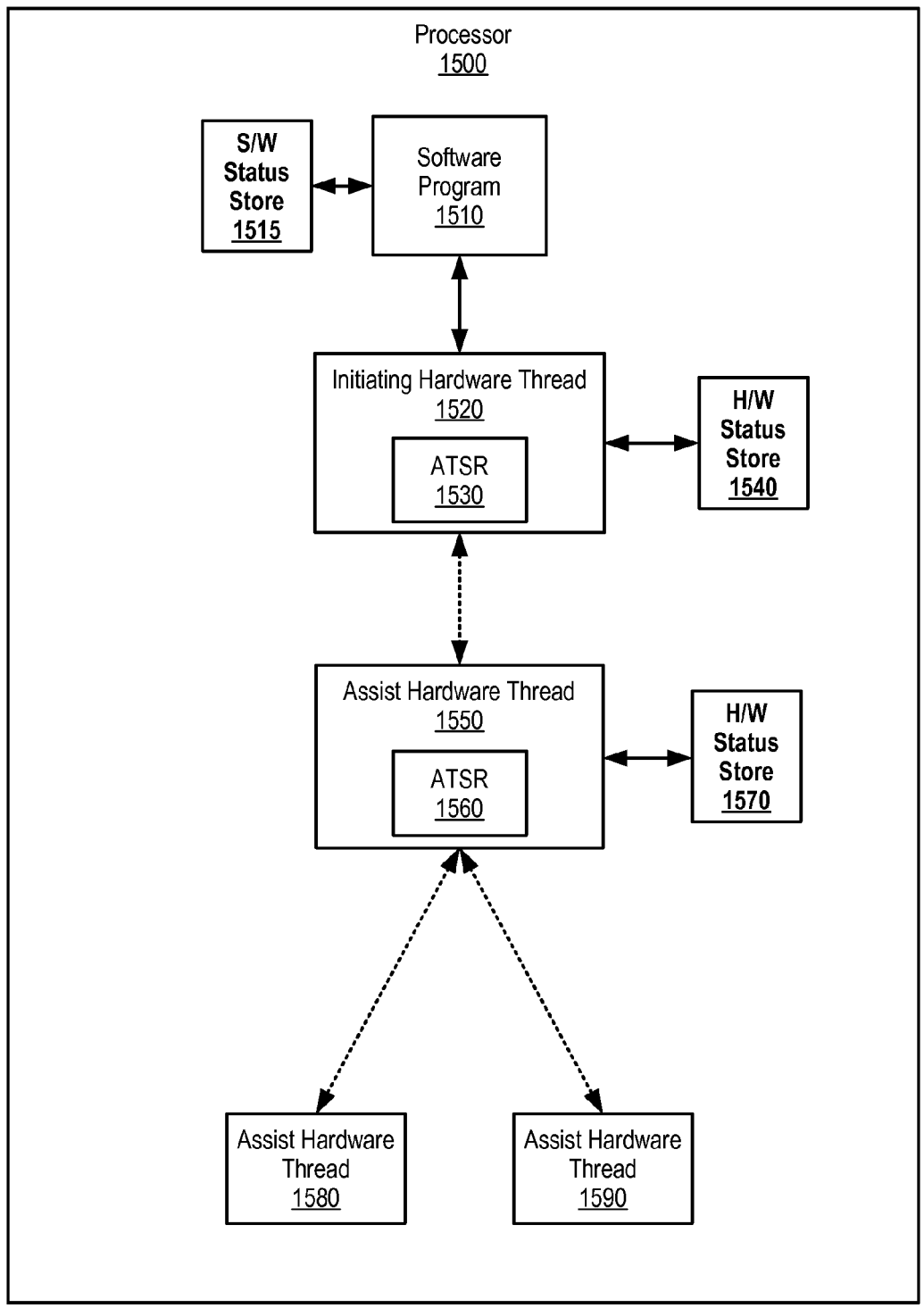
FIG. 15 is an exemplary diagram showing an initiating hardware thread invoking an assist hardware thread that, in turn, invokes other assist hardware threads.

FIG. 15 is an exemplary diagram showing an initiating hardware thread invoking an assist hardware thread that, in turn, invokes other assist hardware threads. Processor 1500 assigns initiating hardware thread 1520 to software program 1510 when software program 1510 commences. Software program 1510 includes multiple branch and initiate instructions described herein that, for example, may be tiered within software code.

Initiating hardware thread 1520 executes one of the branch and initiate instructions, which results in initiating hardware thread 1520 invoking assist hardware thread 1550. Initiating hardware thread 1520 stores a corresponding ATN for assist hardware thread 1550 in hardware status store 1540 and software program 1510 stores the ATN in software status store 1515 as discussed herein.

Assist hardware thread 1550 commences execution, and executes two branch and initiate instructions. In turn, assist hardware thread 1550 initiates assist hardware threads 1580-1590, and stores corresponding ATN's in hardware status store 1570 accordingly. Software program 1510 also stores the ATN's in software status store 1515 as discussed herein.

In addition, assist hardware thread 1550 uses ATSR 1560 to track assist hardware threads 1580-1590. As such, ATSR 1560 includes information of the most recently initiated assist hardware thread (e.g., assist hardware thread 1590's ATN). In turn, the last of assist hardware threads 1580-1590 that stops executing stores information in ATSR 1560 (see FIGS. 2, 5, and corresponding text for further details).

Figure 16:
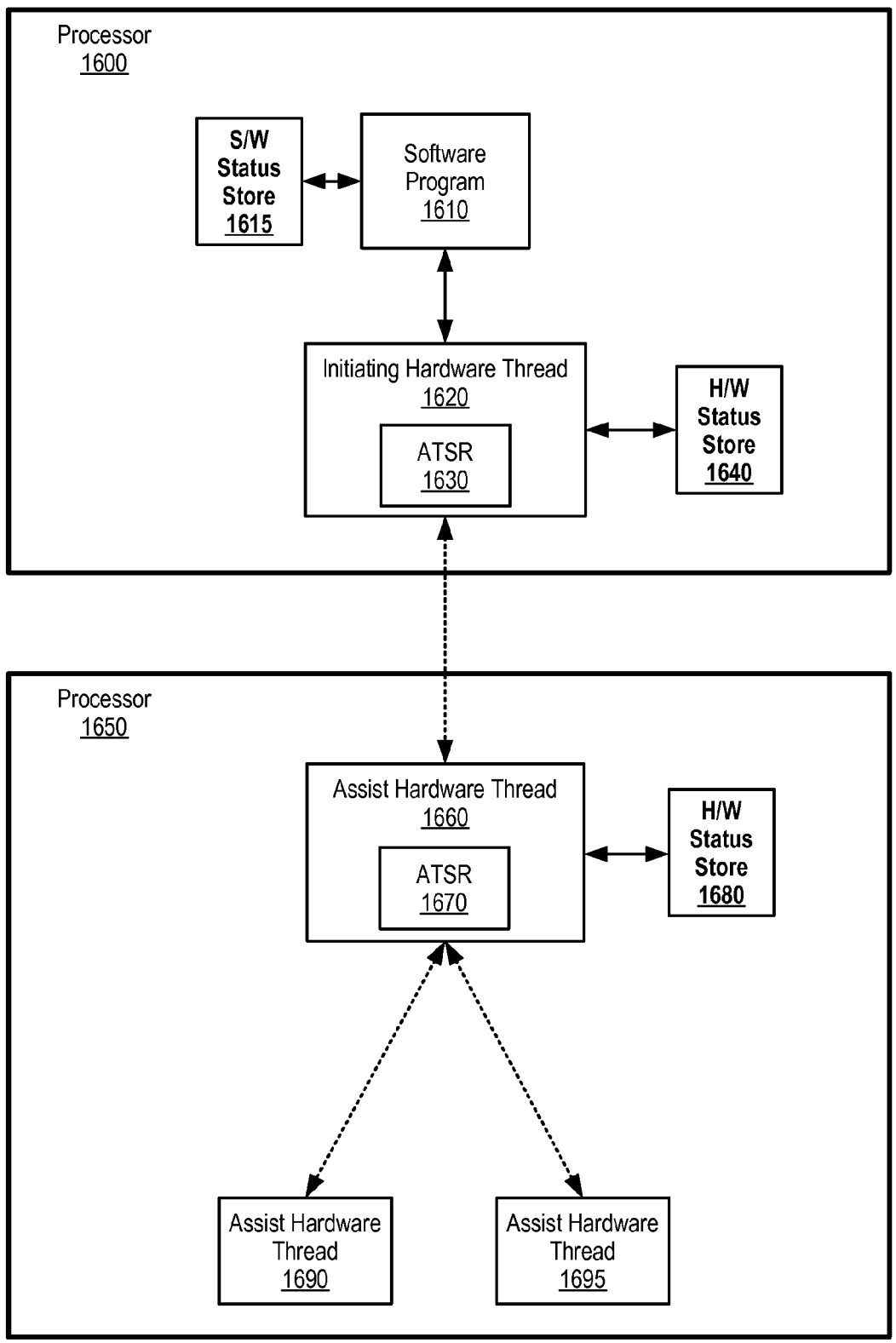
FIG. 16 is an exemplary diagram showing an initiating hardware thread invoking an assist hardware thread on a different processor.

FIG. 16 is an exemplary diagram showing an initiating hardware thread invoking an assist hardware thread on a different processor. FIG. 16 is similar to FIG. 15 with the exception that the assist hardware threads execute on a different processor than the initiating processor executes the initiating hardware thread.

Processor 1600 assigns initiating hardware thread 1620 to software program 1610 when software program 1610 commences. Software program 1610 includes multiple branch and initiate instructions described herein that, for example, may be tiered within software code.

Initiating hardware thread 1620 executes one of the branch and initiate instructions, which results in initiating hardware thread invoking assist hardware thread 1650 on processor 1650, and storing a corresponding ATN in hardware status store 1640. Software program 1610 also stores the ATN in software status store 1615.

Assist hardware thread 1660 commences execution, and executes two branch and initiate instructions. In turn, assist hardware thread 1660 initiates assist hardware threads 1690-1695, and stores corresponding ATN's in hardware status store 1680 accordingly. Software program 1610 also stores the ATN's in software status store 1615 as discussed herein.

Assist hardware thread 1660 uses ATSR 1670 to track assist hardware threads 1690-1695. As such, ATSR 1670 includes information of the most recently initiated assist hardware thread (e.g., assist hardware thread 1695's ATN). In turn, the last of assist hardware threads 1690-1695 that stops executing stores information in ATSR 1670 (see FIGS. 2, 5, and corresponding text for further details).

Figure 17:
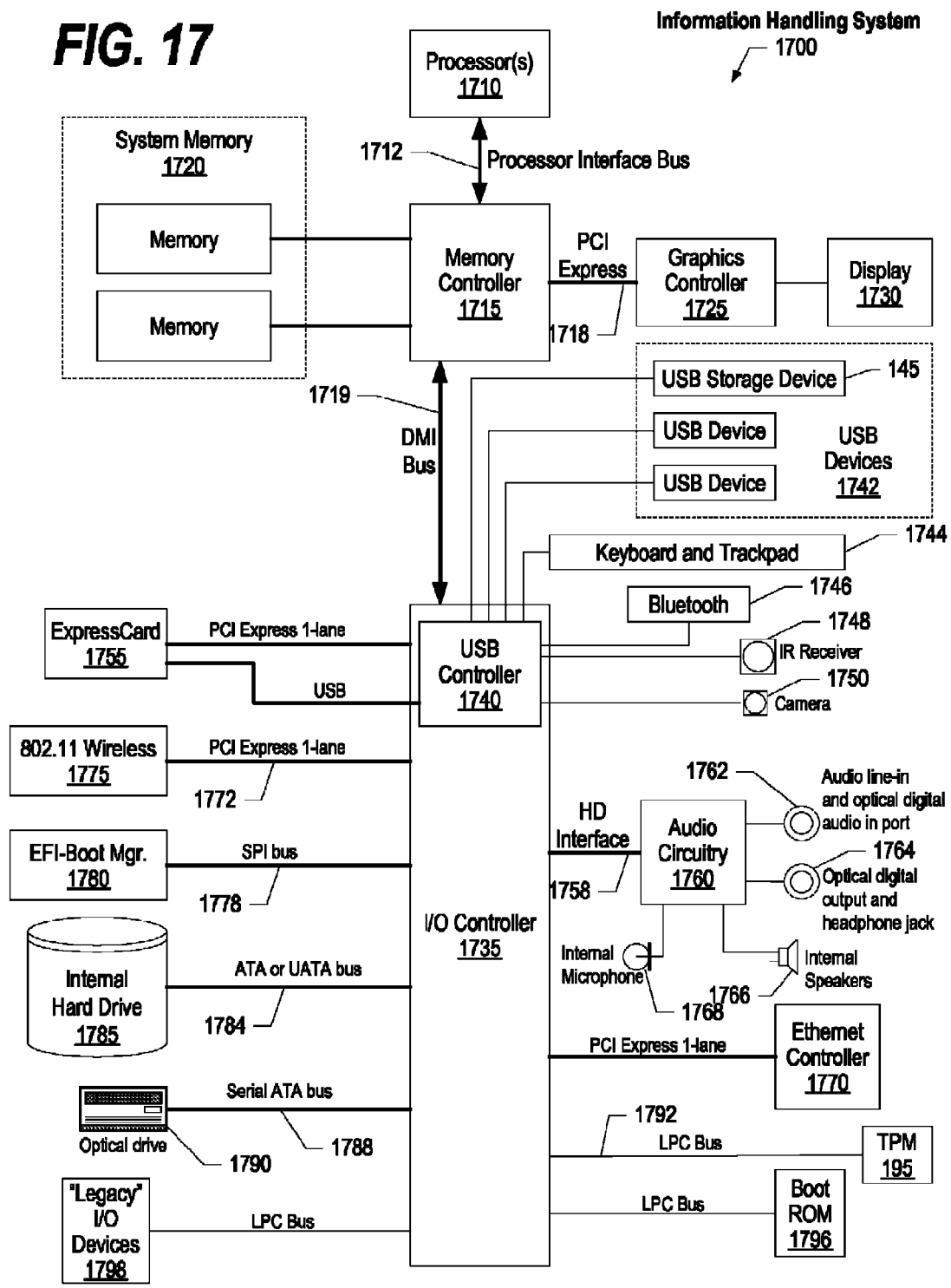
FIG. 17 is a block diagram example of an information handling system in which the methods described herein may be implemented.

FIG. 17 illustrates information handling system 1700, which is a simplified example of a computer system capable of performing the computing operations described herein. Information handling system 1700 includes one or more processors 1710 coupled to processor interface bus 1712. Processor interface bus 1712 connects processors 1710 to a memory controller that connects to system memory 1720 and provides a means for processor(s) 1710 to access the system memory. Graphics controller 1725 also connects to the memory controller. In one embodiment, PCI Express bus 1718 connects the memory controller to graphics controller 1725. Graphics controller 1725 connects to display device 1730, such as a computer monitor.

Memory controller 1715 and I/O controller 1735 connect to each other using bus 1719. In one embodiment, the bus is a Direct Media Interface (DMI) bus that transfers data at high speeds in each direction between memory controller 1715 and I/O controller 1735. I/O controller 1735, also known as the I/O Controller Hub (ICH) is a chip that generally implements capabilities that operate at slower speeds than the capabilities provided by the memory controller. I/O controller 1735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1796 and "legacy" I/O devices (using a "super I/O" chip). The "legacy" I/O devices (1798) can include, for example, serial and parallel ports, keyboard, mouse, and/or a floppy disk controller. The LPC bus also connects I/O controller 1735 to Trusted Platform Module (TPM) 1795. Other components often included in I/O controller 1735 include a Direct Memory Access (DMA) controller, a Programmable Interrupt Controller (PIC), and a storage device controller, which connects I/O controller 1735 to nonvolatile storage device 1785, such as a hard disk drive, using bus 1784.

ExpressCard 1755 is a slot that connects hot-pluggable devices to the information handling system. ExpressCard 1755 supports both PCI Express and USB connectivity as it connects to I/O controller 1735 using both the Universal Serial Bus (USB) the PCI Express bus. I/O controller 1735 includes USB Controller 1740 that provides USB connectivity to devices that connect to the USB. These devices include webcam (camera) 1750, infrared (IR) receiver 1748, keyboard and trackpad 1744, and Bluetooth device 1746, which provides for wireless personal area networks (PANs). USB Controller 1740 also provides USB connectivity to other miscellaneous USB connected devices 1742, such as a mouse, removable nonvolatile storage device 1745, modems, network cards, ISDN connectors, fax, printers, USB hubs, and many other types of USB connected devices. While removable nonvolatile storage device 1745 is shown as a USB-connected device, removable nonvolatile storage device 1745 could be connected using a different interface, such as a Firewire interface, etcetera.

Wireless Local Area Network (LAN) device 1775 connects to I/O controller 1735 via the PCI or PCI Express bus 1772. LAN device 1775 typically implements one of the IEEE 802.11 standards of over-the-air modulation techniques that all use the same protocol to wirelessly communicate between information handling system 1700 and another computer system or device. Optical storage device 1790 connects to I/O controller 1735 using Serial ATA (SATA) bus 1788. Serial ATA adapters and devices communicate over a high-speed serial link. The Serial ATA bus also connects I/O controller 1735 to other forms of storage devices, such as hard disk drives. Audio circuitry 1760, such as a sound card, connects to I/O controller 1735 via bus 1758. Audio circuitry 1760 also provides functionality such as audio line-in and optical digital audio in port 1762, optical digital output and headphone jack 1764, internal speakers 1766, and internal microphone 1768. Ethernet controller 1770 connects to I/O controller 1735 using a bus, such as the PCI or PCI Express bus. Ethernet controller 1770 connects information handling system 1700 to a computer network, such as a Local Area Network (LAN), the Internet, and other public and private computer networks.

While FIG. 17 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim 1ncludes the introductory phrases "one or more" or "at least one" and indefinite articles such as "a" or "an"; the same holds true for the use in the claims of definite articles.

What is claimed is:

1. An information handling system comprising:
   one or more processors;
   a memory coupled to at least one of the processors;
   a set of instructions stored in the memory and executed by
      at least one of the processors in order to perform actions
      of:

identifying a request, at a first hardware thread included in one of the one or more processors, to initiate a second hardware thread included in one of the one or more processors;

identifying, by the first hardware thread, one or more register values stored in one or more first registers included in the first hardware thread;

copying, by the first hardware thread, the one or more register values from the one or more first registers to one or more second registers included in the second hardware thread; and executing a portion of the set of instructions on the second hardware thread, wherein the executing includes the second hardware thread accessing one or more of the copied register values located in the one or more second registers.

2. The information handling system of claim 1 wherein:
the first hardware thread executes a branch and initiate instruction to invoke the request; and
the initiation of the second hardware thread is independent of a hypervisor.

3. The information handling system of claim 1 wherein the one or more second registers are a first subset of a plurality of second hardware thread registers, and wherein the set of instructions performs actions of:

identifying a second subset of second registers included in the plurality of second hardware thread registers, wherein the second subset of second registers are each accessible by the second hardware thread and fail to include one of the copied register values; and clearing each of the second subset of second registers.

4. The information handling system of claim 1 wherein the set of instructions performs actions of:

executing a stop assist thread instruction at the second hardware thread; and in response to executing the stop assist thread instruction:
storing, by the second hardware thread, a termination indicator in an assist thread status field accessible by the first hardware thread;
storing, by the second hardware thread, a stop instruction parameter value in a stop instruction parameter field accessible by the first hardware thread;
storing, by the second hardware thread, a next instruction address in a next instruction field accessible by the first hardware thread; and
clearing, by the second hardware thread, an assist thread executing bit included in an assist thread executing field accessible by the first hardware thread.

5. The information handling system of claim 4 wherein the set of instructions includes an instruction that invokes the request, and wherein the set of instructions performs actions of:

prior to identifying the register values, determining, by the first hardware thread, that the second hardware thread is available;

in response to determining that the second hardware thread is available:
setting, by the first hardware thread, an assist thread value bit; and
generating, by the first hardware thread, an assist thread number value that corresponds to the second hardware thread;
checking the assist thread value bit; and
sending a subset of instructions to the second hardware thread in response to detecting that the assist thread bit value is set.

6. The information handling system of claim 4 wherein the set of instructions performs actions of:

determining whether to require store operation visibility between the first hardware thread and the second hardware thread;

generating a branch and initiate heavy instruction in response to requiring store operating visibility, wherein the branch and initiate heavy instruction invokes a memory synchronization step ; and generating a branch and initiate light instruction in response to not requiring store operating visibility, wherein the branch and initiate light instruction does not invoke the memory synchronization step.

7. The information handling system of claim 4 wherein the set of instructions performs actions of:

determining, by the first hardware thread, whether a copy bit is set in the instruction; and including one or more implementation-dependent set of register values in the copied register values in response to determining that the copy bit is set.

8. The information handling system of claim 1 wherein address translation values are included in the one or more register values that are copied to the one or more second registers, resulting in the second hardware thread and the first hardware thread having a same address translation.

9. A processor comprising:
a first hardware thread;
one or more first registers included in the first hardware thread, the one or more first registers including one or more register values;
a second hardware thread initiated by the first hardware thread;
one or more second registers included in the second hardware thread; and
wherein the first hardware thread copies the register values from the one or more first registers to the one or more second registers in response to initiating the second hardware thread, and wherein the second hardware thread accesses one or more of the copied register values included in the one or more second registers in response to executing software code.

10. The processor of claim 9 further comprising:
a first execution unit included in the first hardware thread; and
a second execution unit included in the second hardware thread, wherein the second execution unit is different from the first execution unit.

11. The processor of claim 9 wherein the first hardware thread initiates the second hardware thread independent from a hypervisor.

* * * * *